United States Patent [19]

Lin

[11] Patent Number: 6,010,015
[45] Date of Patent: Jan. 4, 2000

[54] DECORATIVE COMPACT DISK RACK

[76] Inventor: Hsiang-Yung Lin, No. 20, Chen Gong St., Ming Hsiung Shiang, Chia I Hsien, Taiwan

[21] Appl. No.: 09/184,263

[22] Filed: Nov. 2, 1998

[51] Int. Cl.[7] ....................................................... A47F 5/00
[52] U.S. Cl. ............................... 211/40; 200/10; 200/135; 200/186
[58] Field of Search .................................. 211/40, 41.12, 211/189, 186, 10, 135

[56] References Cited

U.S. PATENT DOCUMENTS

| | | | |
|---|---|---|---|
| 3,269,788 | 8/1966 | Kneer | 200/10 X |
| 4,062,302 | 12/1977 | Krizan | 211/135 X |
| 4,373,449 | 2/1983 | Klaus et al. | 211/135 X |
| 5,769,244 | 6/1998 | Wyatt | 211/40 |
| 5,826,729 | 10/1998 | Oosterom | 211/40 |

*Primary Examiner*—Robert W. Gibson, Jr.
*Attorney, Agent, or Firm*—Rosenberg, Klein & Lee

[57] ABSTRACT

A decorative compact disc rack comprises partition boards, deck boards, supporters, a back board and connecting plates, wherein the partition boards and the deck boards are interconnected cross each other forming a rack with a plurality of partitions, the supporters are secured at two sides of the rack and the connecting plates are fastened to the top and the bottom ends of the rack and the back board is secured to the rear end of the rack.

3 Claims, 6 Drawing Sheets

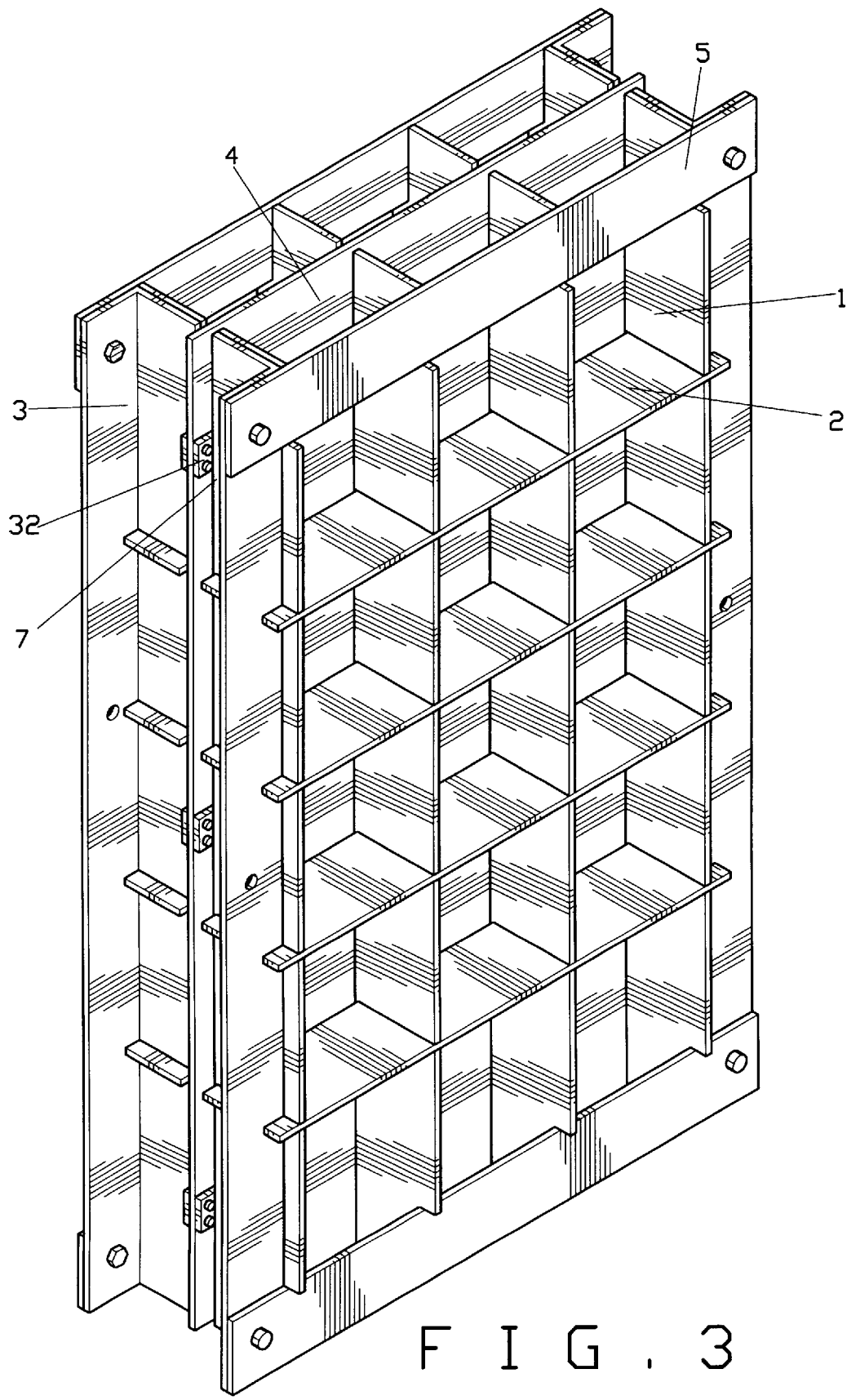
F I G . 3

DECORATIVE COMPACT DISK RACK

FIELD OF THE INVENTION

This invention relates to a decorative compact disc rack, and in particular to a CD rack which is adjustable at its size and shape to fit to a room with a various space.

BACKGROUND OF THE INVENTION

The conventional CD rack designs are mostly placed a lot of plates and boards in a box or a rack to partition several spaces. And each space is again spaced by small strips to support CD therein. These designs comprise a number of shortcomings:

1. the rack is in a fixed shape which needs to be stood on the floor by a wall and has no decorative effect;
2. the rack may hardly display in an attractive status;
3. the rack can only be placed on the ground which is not flexible.

Owing to the above and many others, the inventor has invented this product which is adjustable at its size so that it fits to various places, while owners may enjoy the Do-It-Yourself product.

SUMMARY OF THE INVENTION

It is the primary object of the present invention to provide a decorative CD rack which comprises partition boards, deck boards, supporters, a back board and connecting plates, wherein the partition boards and the deck boards are interconnected cross each other forming a rack with a plurality of partitions, the supporters are secured at two sides of the rack and the connecting plates are fastened to the top and the bottom ends of the rack and the back board is secured to the rear end of the rack. It is easy to assemble and disassemble, more attractive in appearance and takes less space to store and suitable to any room space.

BRIEF DESCRIPTION OF THE DRAWINGS

FIG. 3 is the second embodiment of the present invention;

DETAILED DESCRIPTION OF THE PREFERRED EMBODIMENTS

Figure 1:
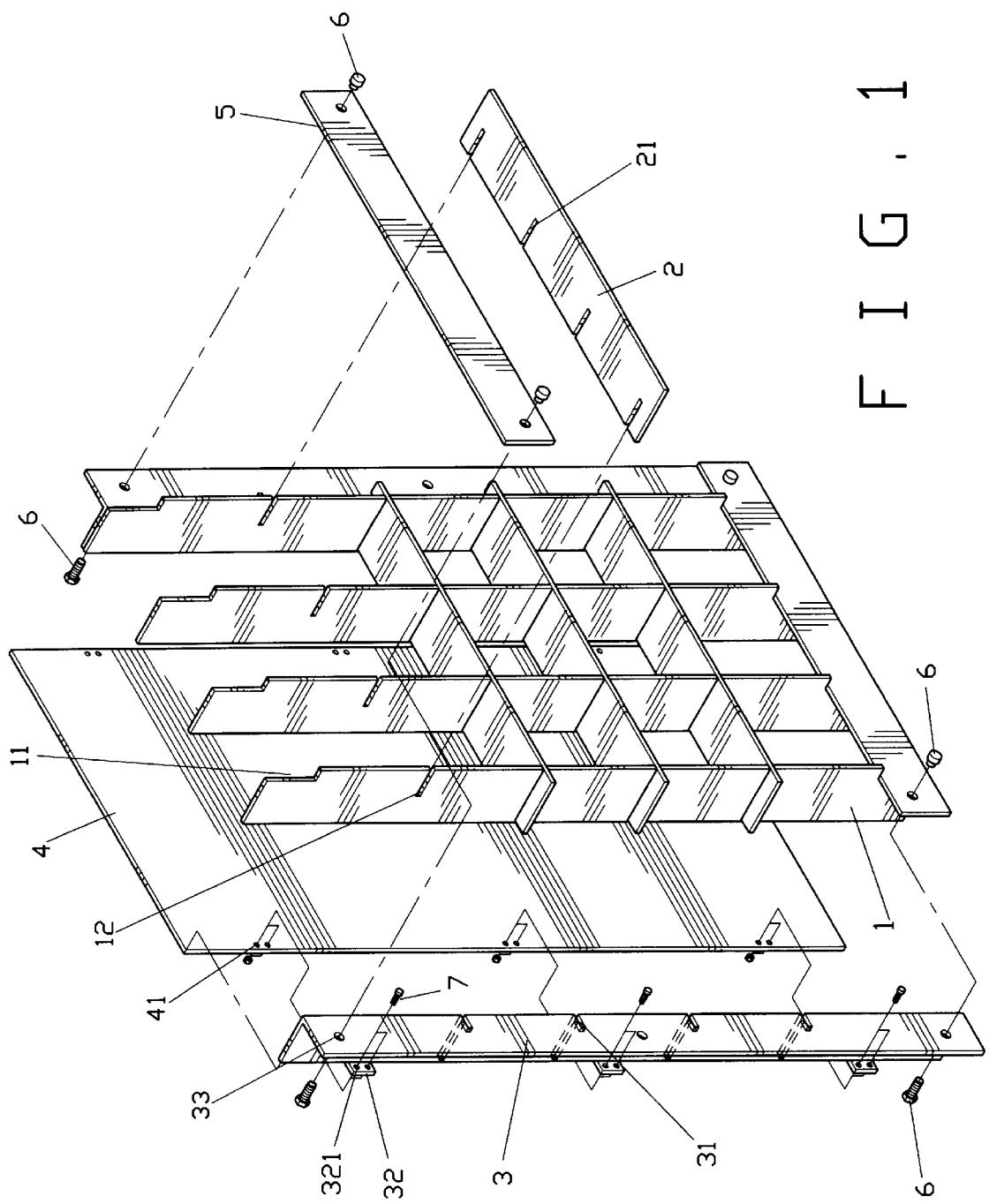
FIG. 1 is an exploded view of the first embodiment of a decorative CD rack of the present invention.

As shown in FIG. 1, the first embodiment of the present invention comprises partition boards 1, deck boards 2, supporters 3, a back board 4, and connecting plates 5.

The partition boards 1 have a recess 11 on the top and the bottom ends of each board, and a plurality of slots 12 spaced from each other extending along the boards 1 for receiving slots 21 of the deck boards 2 to be secured therein in cross connections.

The supporters 3 are each in an L-shaped plate having a number of slots 31 thereon spaced from each other, a plural lugs 32 formed on inner edge having locating holes 321 thereat, a plural holes 33 are formed on the supporters 3 spacing from each other.

The back board 4 has a plural through holes 41 corresponding to the lugs 32 of the supporters 3.

The connecting plates 5 are longitudinal plates having holes 51 at respective ends of each plate 5.

Figure 2:
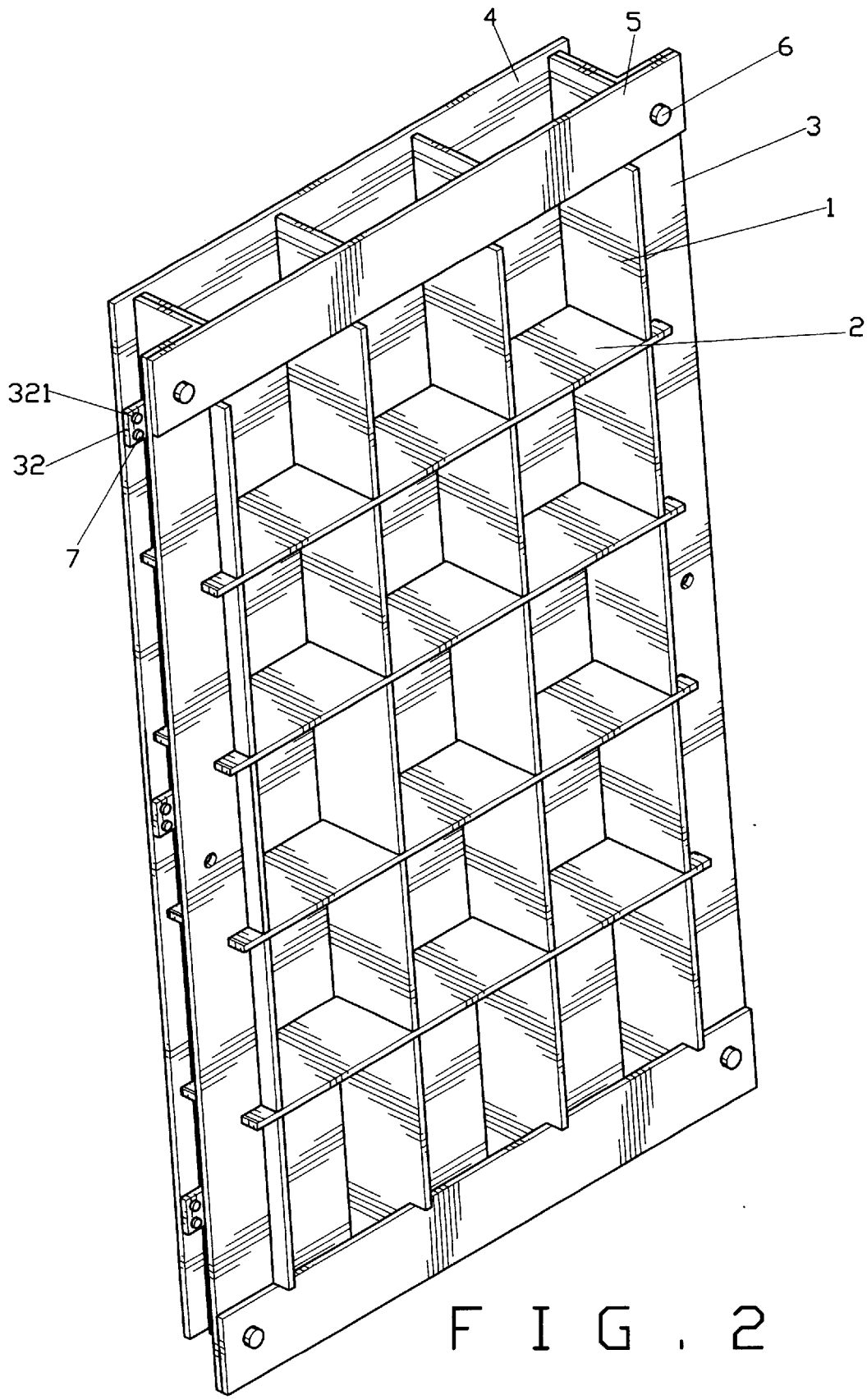
FIG. 2 is a perspective view of FIG. 1.

To assemble the first embodiment of the present invention, as shown in FIG. 2, place the open side of the L-shaped supporters 3 facing outward, and the slots 31 facing the deck boards 2 and secured therein. The top and the bottom ends of the supporters 3 were screwed tight to the holes 51 of the connecting plates 5 and the holes 33 of the supporters 3 by means of fasteners 6 and seating on the recesses 11 of the partition boards 1. The back board 4 at this moment is placed against the lugs 32 of the supporters 3 and secured by fasteners 7 and through the locating holes 321 and the through holes 41.

In order to display the rack in a double-sided effect, a pair of CD racks of the present invention are placed against each other, as shown in FIG. 3, and secured by inserting fasteners 7 through the lug 32 and the back board 4 and screwed tight thereat. This connection not only display the rack in two sides, but also provide a table standing status.

Figure 4:
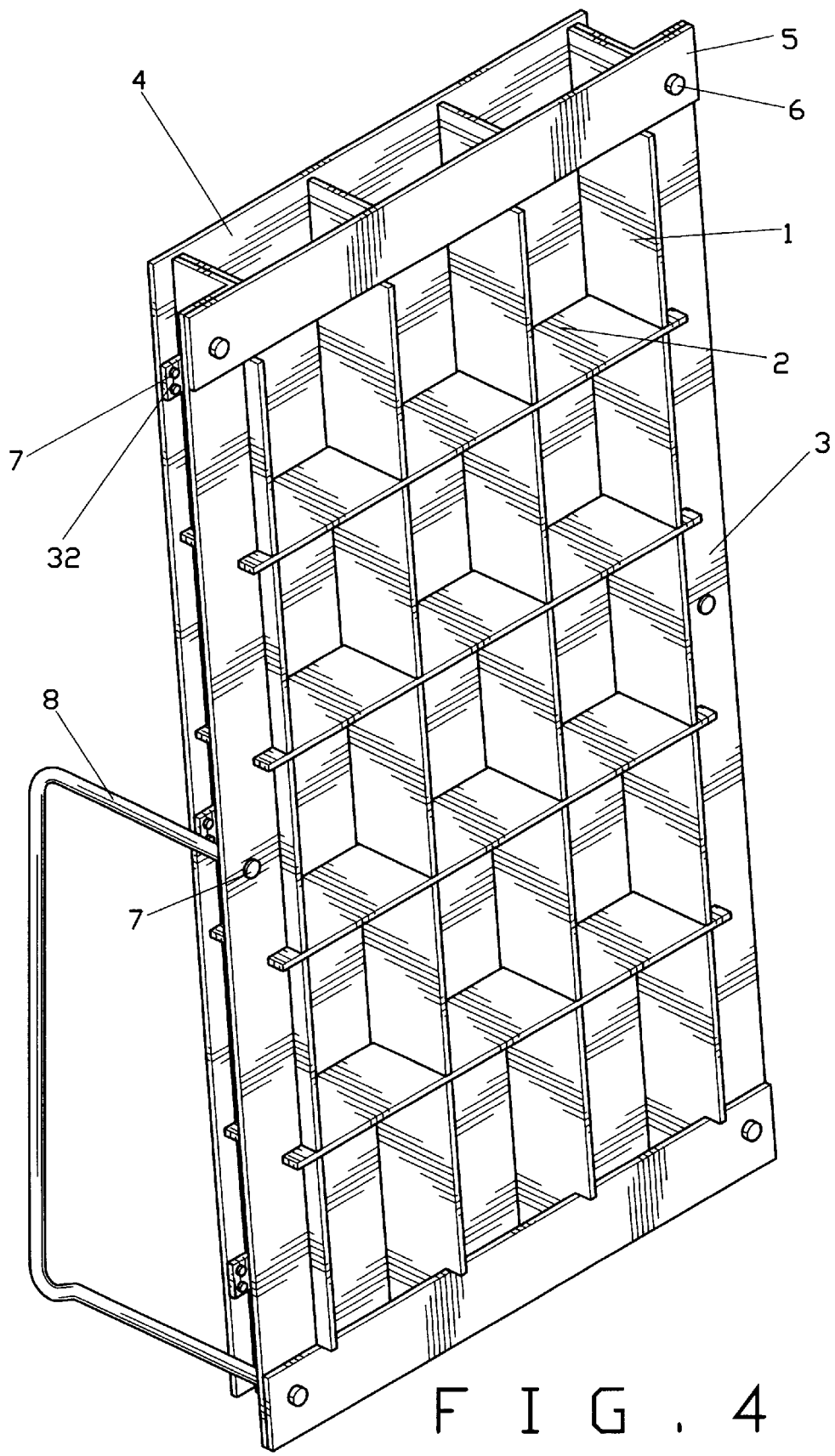
FIG. 4 is the third embodiment of the present invention.
Figure 5:
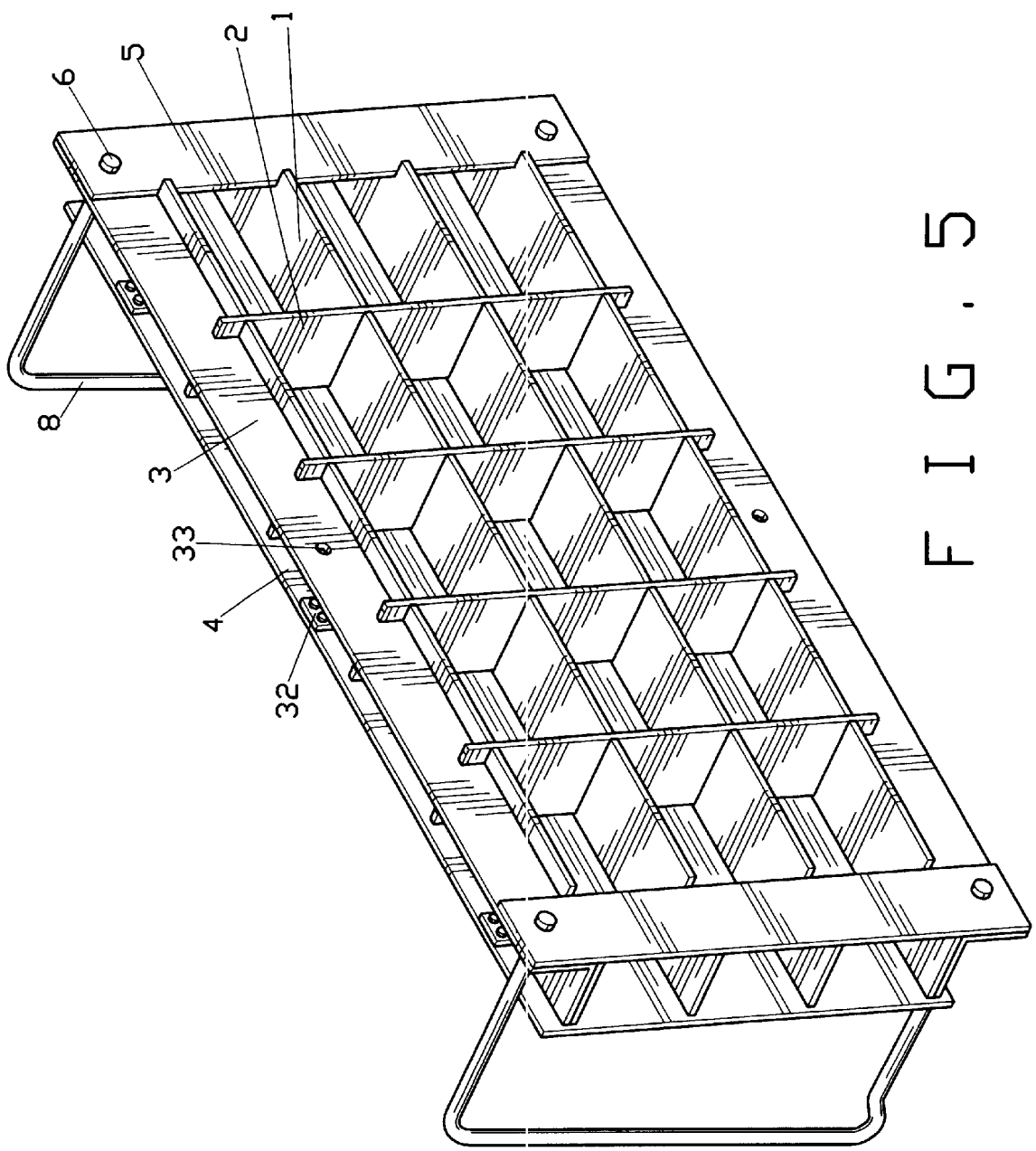
FIG. 5 is the forth embodiment of the present invention.

FIG. 4 is another embodiment which utilizes a stand 8 to be secured to the through holes 33 of the supporters 3 by means of fasteners 6 to support the rack standing on the ground. FIG. 5 is a further embodiment which is similar to the FIG. 4 but stands on the ground in a different way. The rack showing in FIG. 5 is so designed that the rack stands horizontally with the two ends of the stand 8 securely fastened to the top and the bottom corners. Whereas FIG. 4 has shown the rack standing in a vertical status. The standing status may be varied depending upon the room space and many other restricted area.

Figure 6:
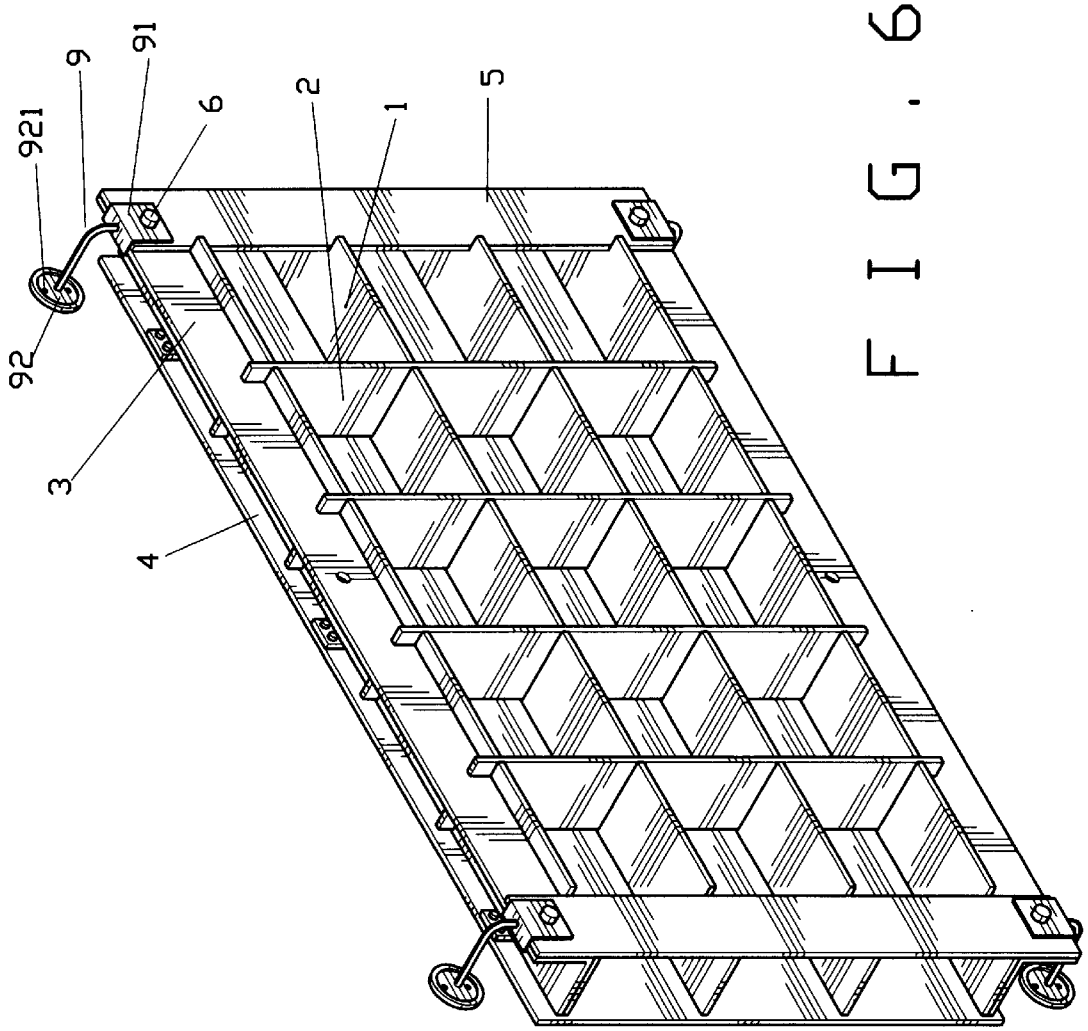
FIG. 6 is a fifth embodiment of the present invention.

FIG. 6 uses hangers 9, each hanger 9 has a clip 91 at one end while a plate 92 at the other end is secured to a wall by means of fasteners through holes 921 on the plate 92. The clips 91 are used to hold four corners of the rack, thus, the rack can be hanged on a wall.

I claim:

1. A decorative compact disc rack, comprising:

at least a pair of longitudinally extended L-shaped supporters, each of said supporters having a plurality of longitudinally spaced slots formed therein and a plurality of longitudinally spaced lugs formed on an inner edge of said supporter, each of said lugs having at least one locating hole formed therethrough;

a back board having opposing laterally spaced sides respectively coupled to said pair of supporters, said opposing laterally spaced sides having a plurality of holes formed therethrough in aligned relationship with said locating holes of said plurality of lugs for passage of fasteners therethrough;

a pair of connecting plates respectively coupled between corresponding longitudinal ends of said supporters;

a plurality of longitudinally extended partition boards laterally spaced between said pair of supporters and extending between said pair of connecting plates, each of said partition boards having a plurality of longitudinally spaced slots formed therein; and, a plurality of longitudinally spaced deck boards extending laterally between said supporters, each of said deck boards having a plurality of receiving slots formed in aligned relationship with a respective slot of each of said plurality of partition boards for engagement therebetween.

2. The decorative compact disc rack as recited in claim 1 further comprising a pair of stand members secured to said supporters for supporting said rack on a base surface.

3. The decorative compact disc rack as recited in claim 1 further comprising a plurality of hangers respectively coupled to opposing ends of said supporters, each of said hangers being adapted for securement to a building's wall on one end thereof and having a clip coupled to an opposing end of said hanger for engagement with an end portion of a respective supporter.

* * * * *